United States Patent [19]
Kamei et al.

[11] Patent Number: 5,641,180
[45] Date of Patent: Jun. 24, 1997

[54] VEHICLE SUBFRAME ASSEMBLY

[75] Inventors: Takahiro Kamei; Yoshitaka Sekiguchi, both of Saitama-ken, Japan

[73] Assignee: Honda Giken Kogyo Kabushiki Kaisha, Tokyo, Japan

[21] Appl. No.: 534,033

[22] Filed: Sep. 26, 1995

[30] Foreign Application Priority Data

Sep. 29, 1994 [JP] Japan .................................. 6-259541

[51] Int. Cl.$^6$ ............................................ B62D 21/00
[52] U.S. Cl. ................................... 280/781; 180/291
[58] Field of Search ............................. 280/781, 784, 280/785, 788; 180/291, 299, 311, 312

[56] References Cited

U.S. PATENT DOCUMENTS

| | | | |
|---|---|---|---|
| 2,776,721 | 1/1957 | Giacosa | 180/291 |
| 3,869,017 | 3/1975 | Feustel et al. | 180/291 |
| 4,046,415 | 9/1977 | Klees et al. | 280/781 |

FOREIGN PATENT DOCUMENTS

| | | | |
|---|---|---|---|
| 477654 | 4/1992 | European Pat. Off. | 280/781 |
| 3927924 | 8/1990 | Germany | 280/785 |
| 61-39651 | 11/1986 | Japan . | |
| 1-12916 | 1/1989 | Japan | 180/291 |
| 168926 | 9/1921 | United Kingdom | 180/291 |

*Primary Examiner*—Paul N. Dickson
*Attorney, Agent, or Firm*—Armstrong, Westerman, Hattori, McLeland & Naughton

[57] ABSTRACT

In a vehicle subframe including a pair of longitudinal members which extend in parallel with each other along a longitudinal direction of a vehicle body, and lateral members which extend across the longitudinal members, a connecting member extends across intermediate points of two of the lateral members which are disposed adjacent to each other, and one of the engine mounts is provided on the connecting member. Thereby, the load from the engine can be favorably distributed over the lateral members, and the rigidity at the points for mounting the engine can be increased, whereby the vibrations from the engine are effectively shut off from the passenger compartment. Additionally, the lateral members are not subjected to any significant localized stresses, and can be therefore made lighter in weight.

4 Claims, 6 Drawing Sheets

VEHICLE SUBFRAME ASSEMBLY

CROSS REFERENCE TO RELATED APPLICATIONS

The following applications on subject matters similar to those of the present application were contemporaneously filed by the same inventors, and the contents of these copending applications are incorporated in the present application by reference.

U.S. patent application No. 08/533,778 filed Sep. 26, 1995 (Our Ref: F427) (based on Japanese patent application No. 6-266301 filed Oct. 5, 1994); and U.S. patent application No. 08/533,779 filed Sep. 26, 1995 (Our Ref: F428) (based on Japanese patent application No. 6-259542 filed Sep. 29, 1994)

TECHNICAL FIELD

The present invention relates to a vehicle subframe assembly wherein a vehicle engine is mounted on a subframe which is interposed between a vehicle body and a wheel suspension system.

BACKGROUND OF THE INVENTION

It has been previously known to mount a subframe on a vehicle body via resilient bushes, and to pivotally attach the inner ends of the lower arms of a wheel suspension system to the subframe. The subframe typically comprises a pair of laterally spaced longitudinal members, and a plurality of lateral members passed across the longitudinal members. The longitudinal members and the lateral members are normally made by stamp forming sheet metal, and each member is typically provided with a closed cross section to the end of ensuring sufficient rigidity. For an example of such a subframe assembly, reference should be made to Japanese utility model publication (kokoku) No. 61-39651.

Mounting the engine on the subframe also reduces the noise that the engine conducts to the passenger compartment. Typically, the engine is mounted on the lateral members which have a closed cross section. However, mounting an engine directly on lateral members creates the need to increase the mechanical strength of the lateral members because the engine tends to apply highly localized stress on the lateral members. This causes an undesirable increase in the weight of the lateral members.

BRIEF SUMMARY OF THE INVENTION

In view of such problems of the prior art, a primary object of the present invention is to provide a vehicle subframe assembly for supporting a vehicle engine, whereby the vehicle subframe has sufficient mechanical strength without excessively increasing the weight thereof.

A second object of the present invention is to provide a vehicle subframe which has great mechanical rigidity in parts where external loads are applied.

A third object of the present invention is to provide a vehicle subframe which is easy and economical to fabricate.

These and other objects of the present invention can be accomplished by providing a vehicle subframe, which is attached to a vehicle body, and supports at least a part of a wheel suspension system, comprising: a pair of longitudinal members which extend in parallel with each other along a longitudinal direction of the vehicle body; a plurality of lateral members which extend across the longitudinal members; a connecting member extending across intermediate points of two of the lateral members which are disposed adjacent to each other; and a plurality of engine mounts provided on the subframe, one of the engine mounts being provided on the connecting member. The lateral members typically include a front lateral member, a rear lateral member, and an intermediate member, the connecting member preferably extending between the intermediate lateral member and the rear lateral member.

According to this arrangement, the load from the engine can be favorably distributed over the lateral members, and the rigidity at the points for mounting the engine can be increased, whereby the effective mechanical strength and rigidity of the lateral members, with respect to the load from the engine, can be increased, and the vibrations from the engine that are conducted to the passenger compartment can be effectively reduced.

According to a preferred embodiment of the present invention, a rear end portion of each of the longitudinal members is somewhat elevated as compared to the remaining part of the longitudinal member, and the rear lateral member extends between the elevated rear end portions of the longitudinal members. The intermediate lateral member is joined to the longitudinal members via a pair of leg sections extending substantially upright from the longitudinal members so that the intermediate lateral member extends at a substantially same elevation as the rear lateral member.

The leg sections can be conveniently used for supporting part of the suspension system, and the three-dimensional shape of the subframe allows the subframe to favorably conform to the mounting surface of the vehicle body. The three-dimensional shape of the subframe is also suited for absorbing energy in case of a vehicle crash.

The connecting member may be secured to the lateral members by a fastening means so as to permit positional adjustment of the connecting member and to accommodate some dimensional errors that may be present in the locations of the mounting points.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
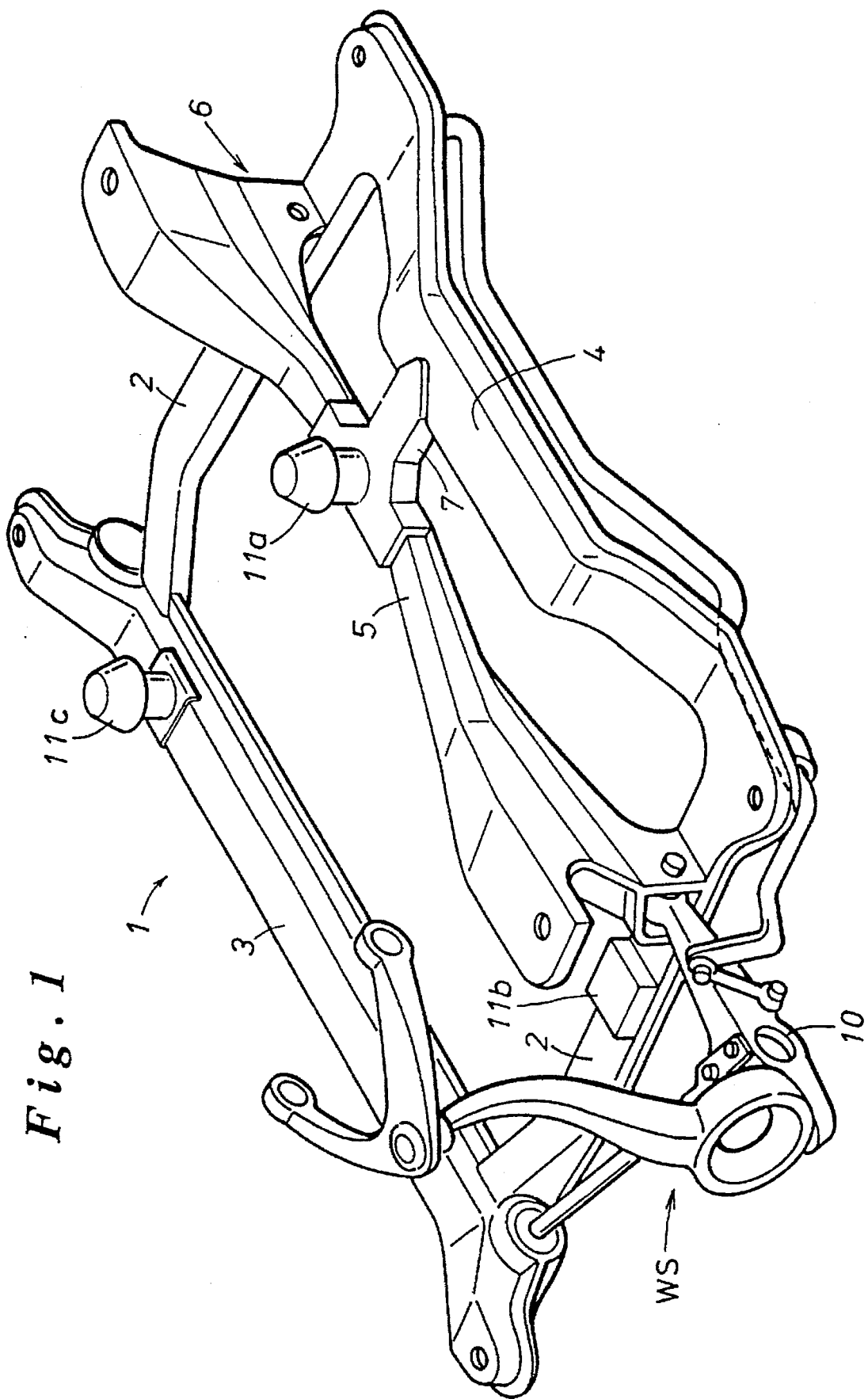
FIG. 1 is a perspective view showing an essential part of a preferred embodiment of the vehicle subframe assembly according to the present invention.
Figure 2:
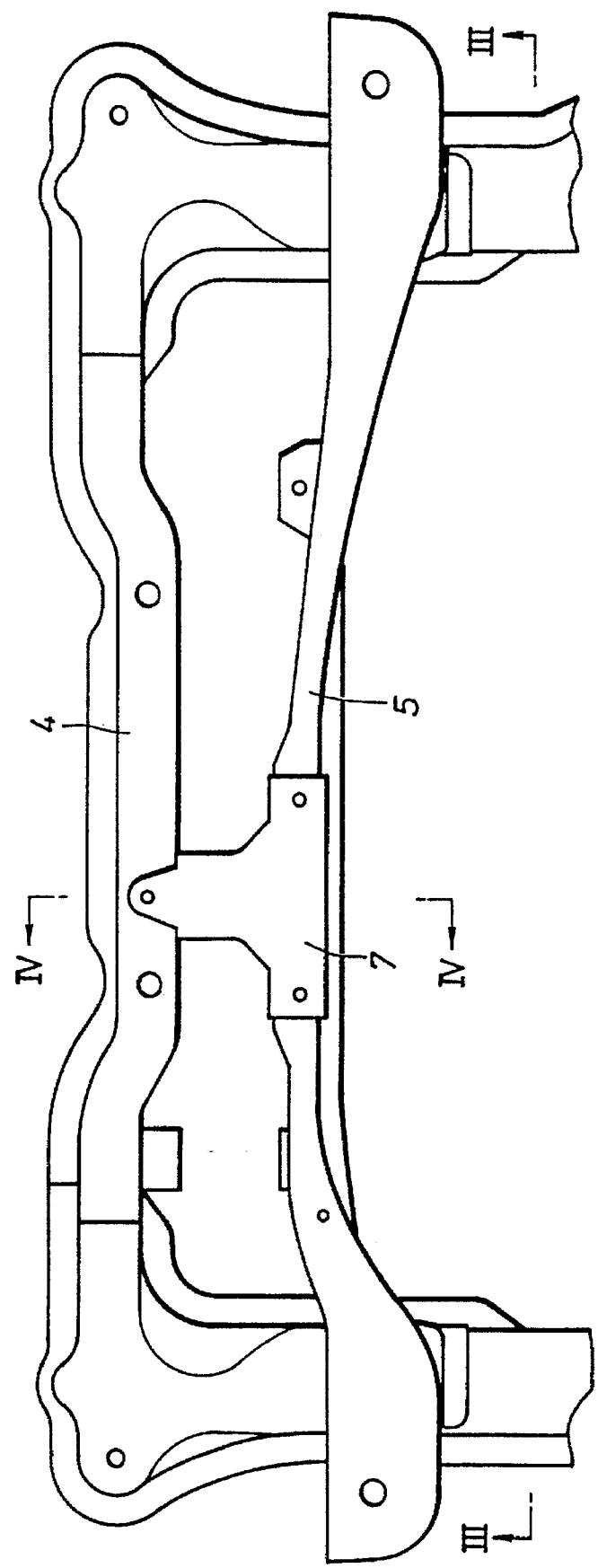
FIG. 2 is a plan view of a part of the subframe assembly of FIG. 1.

FIG. 1 shows a subframe 1 which is mounted on a vehicle body not shown in the drawing, and supports the inner ends of the lower arms 10 of a wheel suspension system WS, of which only the left half of the wheel suspension system WS is shown in the drawing. The subframe 1 comprises a pair of laterally spaced longitudinal members 2, which extend in parallel with each other along the longitudinal direction of the vehicle body, front and rear lateral members 3 and 4, which extend across and over the longitudinal end portions of the longitudinal members 2, and an intermediate lateral member 5, which extends across the longitudinal members 2 somewhat behind and above the mid section of the subflame 1. In this embodiment, the middle part of the rear lateral member 4 is somewhat more elevated than the longitudinal members 2. The intermediate lateral member 5 is provided with a Z-shaped cross section, and is connected to the longitudinal members 2 via substantially upright leg sections 6 so that the intermediate lateral member 5 and the elevated middle part of the rear lateral members 4 extend in a substantially same horizontal plane.

Figure 3:
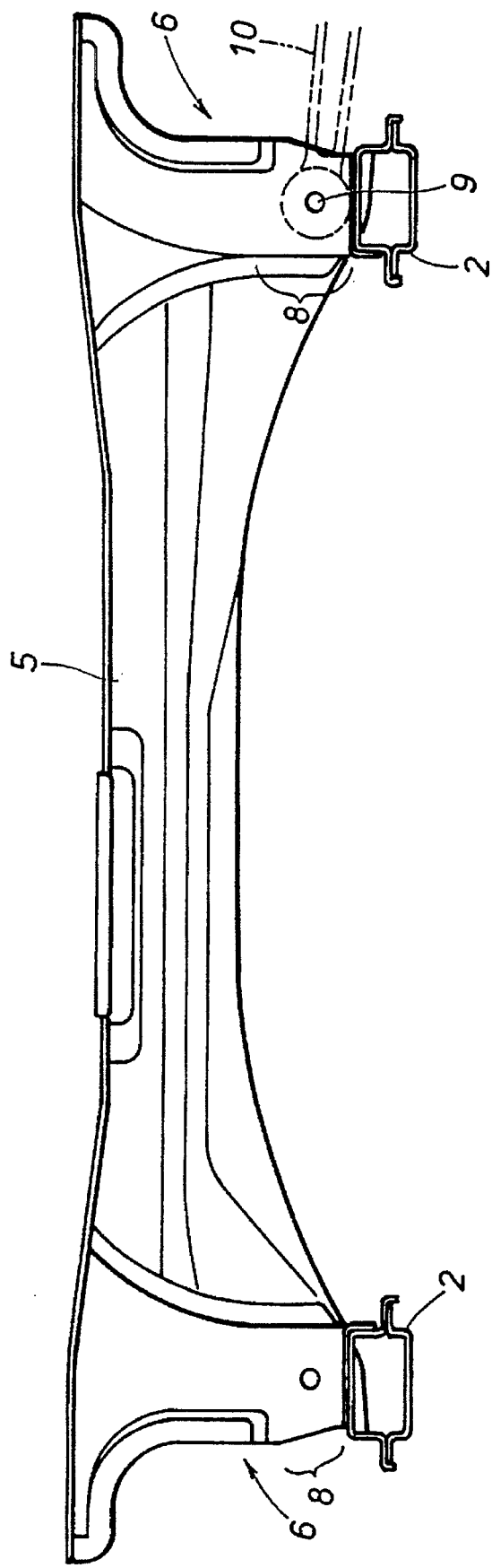
FIG. 3 is a sectional view taken along line III—III of FIG. 2.
Figure 4:
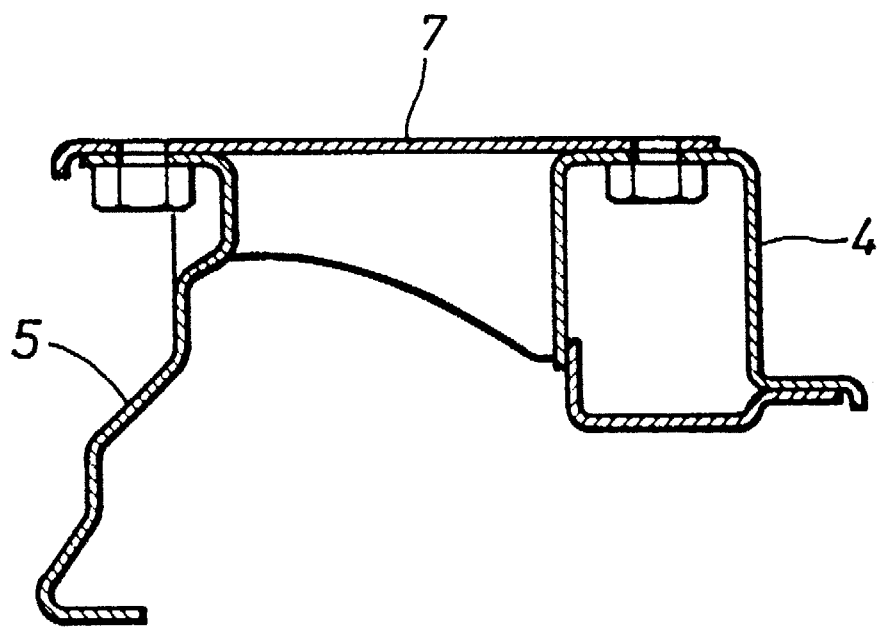
FIG. 4 is a sectional view taken along line IV—IV of FIG. 2.

The third lateral member 5, which is provided with a Z-shaped cross section, is relatively rigid against vertical loads, but is relatively deformable against longitudinal loads (Refer to FIGS. 3 and 4). Each of the leg sections 6, on the other hand, is provided with a rectangular closed cross section. In this embodiment, the intermediate lateral member 5 and the leg sections 6 are integrally formed by stamp forming a single metal sheet, and the leg sections 6 are then given a closed cross section by welding such as electric spot welding. The lower ends of the leg sections 6 are welded to the upper surfaces of the respective longitudinal members 2. Alternatively, the intermediate lateral member 5 and the leg sections 6 may consist of separate stamp formed members which are then joined together by welding.

A connecting member 7 extends across intermediate parts of the intermediate lateral member 5 and the rear lateral member 4. The connecting member 7 is provided with a generally planar main part which is attached to the intermediate and rear lateral members 4 and 5 by fastening means such as threaded bolts, and a pair of flanges 7a, which integrally depend from either side edge of the main part for reinforcement. The mounting holes provided in the lateral members 4 and 5 for attaching connecting members 4 and 5 consist of threaded holes formed for instance by welding nuts to them. The corresponding mounting holes provided in the connecting member 7 may consist of slots or relatively large circular holes so that slight dimensional adjustments can be made when the connecting member 7 is attached to the lateral members 4 and 5.

The engine, which is not shown in the drawings, is supported by three mounting points 11a, 11b, and 11c, provided in the upper surfaces of the connecting member 7, the left longitudinal member, and the front lateral member 3, respectively. Because the mounting point 11a is supported by both the rear and the intermediate lateral members 4 and 5 by way of the connecting member 7, the rigidity required for the rear and the intermediate lateral members 4 and 5 can be reduced, and the weight of these members can be accordingly reduced. This is particularly significant when the mounting point 11a is placed in a relatively middle part of each the lateral members 4 and 5. The third mounting point 11c is supported solely by the front lateral member 3, but as it is more offset from the middle part of the lateral member, the stress applied by the engine to the front lateral member 3 is not as great as that applied to the intermediate and rear lateral members 4 and 5. The second mounting point 11b is provided in the left longitudinal member 2.

Figure 5:
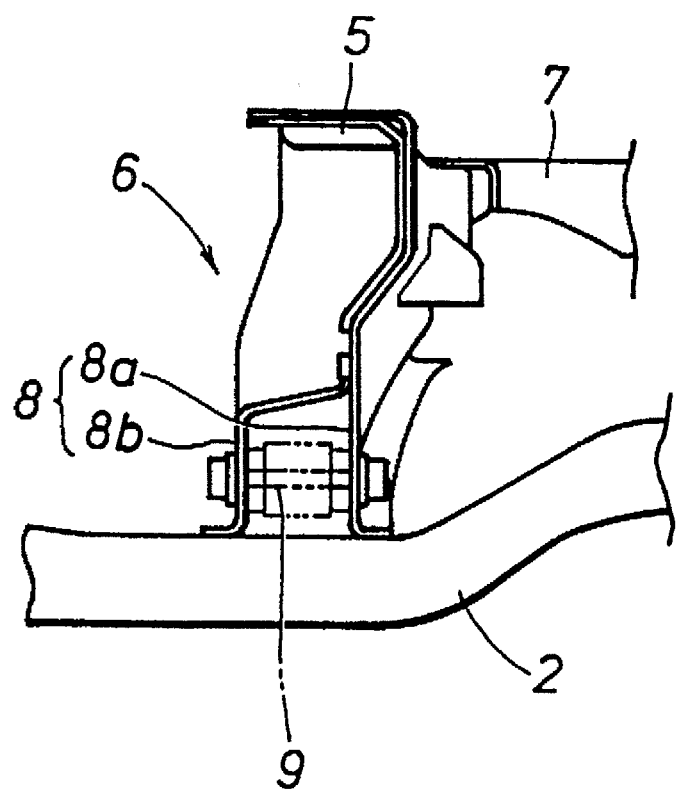
FIG. 5 is a fragmentary side view of the subframe assembly of FIG. 1.
Figure 6:
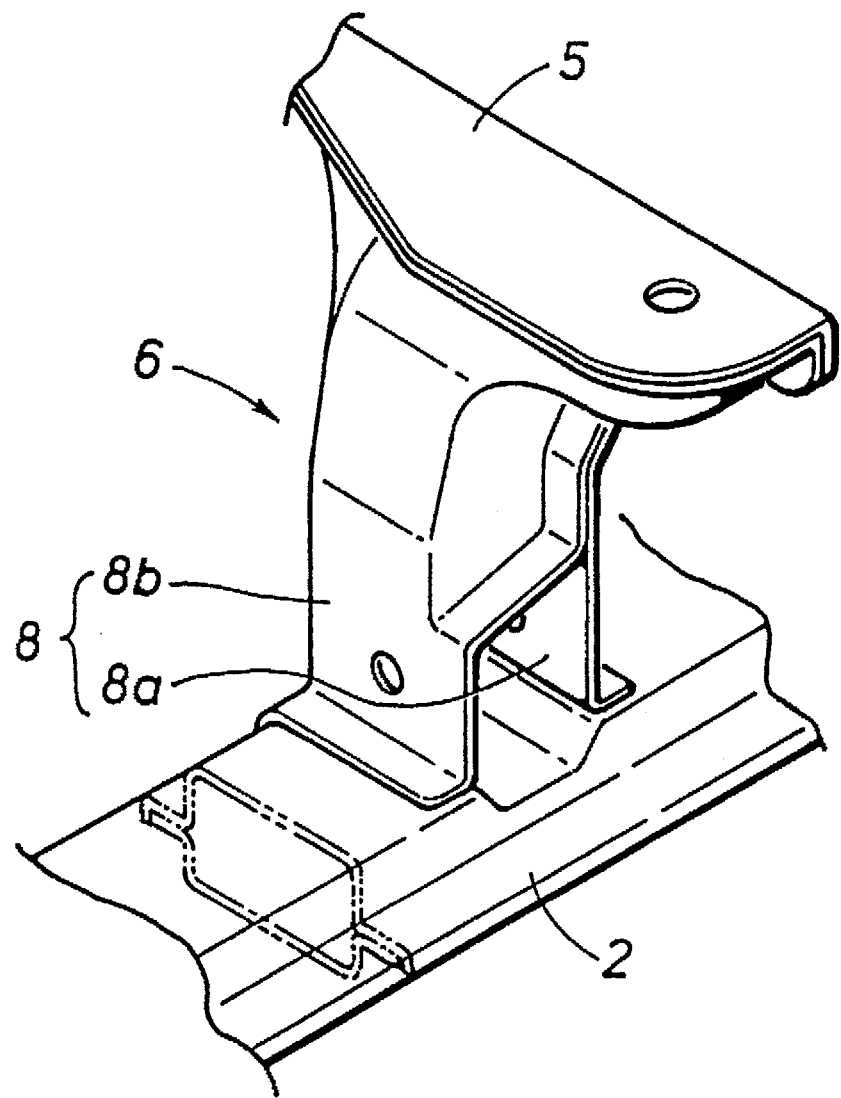
FIG. 6 is a fragmentary perspective view of the subframe assembly of FIG. 1.

As is best illustrated in FIGS. 5 and 6, a lower part of each of the leg sections 6 is provided with a bearing portion 8 which is defined by a pair of mutually opposing planar sections 8a and 8b. An inner end of each lower arm 10 of the wheel suspension system is pivotably supported by the corresponding bearing portion 8 via a pin 9 and a resilient bush, typically made of rubber, which is not shown in the drawings. The two planar sections 8a and 8b are joined by another planar section at a side facing away from the lower arm 10. Thus, each of the leg sections 6 has a closed cross section at its upper portion, and is provided with a C-shaped cross section at its lower portion, but the lower end of each leg section 6 is welded to the upper surface of the corresponding longitudinal member 2, whereby the leg sections 6 are each provided with great mechanical rigidity and great mechanical strength over its entire length. This is desirable because it increases the rigidity of the subflame with respect to the loads, such as the vibrations and noises produced by the wheel, which are applied to the bearing portion 8, and the vibrations and noises are prevented from being transmitted to the passenger compartment.

Thus, according to the present invention, the load from the engine can be favorably distributed over the lateral members, and the rigidity at the points for mounting the engine can be increased, whereby the vibrations from the engine are effectively shut off from the passenger compartment. Additionally, the lateral members are not subjected to any significant localized stress, and can be therefore made lighter in weight. Furthermore, by securing the connecting member between the two lateral members disposed adjacent to each other, preferably by using fastening means instead of welding, and providing one of the mounting points for the engine on this connecting member, it is possible not only to increase the rigidity of the mounting point, but also to accommodate some dimensional errors in the locations of the mounting points by adjusting the position of the connecting member relative to the rest of the subframe.

Although the present invention has been described in terms of a preferred embodiment thereof, it is obvious to a person skilled in the art that various alterations and modifications are possible without departing from the scope of the present invention which is set forth in the appended claims.

What we claim is:

1. A vehicle subframe, which is attached to a vehicle body, comprising:

a pair of longitudinal members extending in parallel with each other along a longitudinal direction of said vehicle body;

a plurality of lateral members extending across said longitudinal members;

a connecting member extending across intermediate points of two of said plurality of lateral members which are disposed adjacent to each other; and a plurality of engine mounts provided on said subframe, one of said engine mounts being provided on a substantially front end of said connecting member, said plurality of lateral members including a front lateral member, a rear lateral member, and an intermediate lateral member, and said connecting member extending between said intermediate lateral member and said rear lateral member.

2. A vehicle subframe according to claim 1, wherein a rear end portion of each of said longitudinal members is elevated as compared to the remaining part of said longitudinal member, and said rear lateral member extends between said elevated rear end portions of said longitudinal members, said intermediate lateral member being joined to said longitudinal members via a pair of leg sections extending substantially upright from said longitudinal members so that said intermediate lateral member extends at a substantially same elevation as said rear lateral member.

3. A vehicle subframe according to claim 2, wherein said connecting member is secured to said lateral members by fastening means so as to permit positional adjustment of said connecting member.

4. A vehicle subframe according to claim 2, wherein each of said leg sections is provided with a beating portion for pivotably supporting an inner end of a lower arm of said wheel suspension system.

* * * * *